United States Patent [19]

Page et al.

[11] Patent Number: 5,365,337
[45] Date of Patent: Nov. 15, 1994

[54] METHOD AND APPARATUS FOR COMPENSATING FOR THE RESIDUAL BIREFRINGENCE IN INTERFEROMETRIC FIBER-OPTIC GYROS

[75] Inventors: L. Jerry Page, Alto; David R. Bina, Grand Rapids; Daniel R. Lynch, Wayland; William G. Otten, Ada, all of Mich.

[73] Assignee: Smiths Industries Aerospace & Defense Systems, Inc., Grand Rapids, Mich.

[21] Appl. No.: 967,795

[22] Filed: Oct. 28, 1992

[51] Int. Cl.$^5$ .............................. G01B 19/72
[52] U.S. Cl. .................... 356/350; 385/12; 385/14; 250/227.27; 356/345
[58] Field of Search ............... 356/350, 345; 250/227.19, 227.27; 385/12, 14

[56] References Cited

U.S. PATENT DOCUMENTS

| | | | |
|---|---|---|---|
| 4,299,490 | 11/1981 | Gahill et al. | 356/350 |
| 4,828,389 | 5/1989 | Gubbins et al. | 356/350 |
| 4,881,817 | 11/1989 | Kim et al. | 356/350 |
| 5,037,205 | 8/1991 | Paulath | 356/350 |

OTHER PUBLICATIONS

Page, Jerry L., "Fiber Gyro with Electro-Optic Phase Modulation", SPIE, vol. 719, 1986, pp. 53–56.
Rashleigh, S. C. and Stolen, R. H., "Preservation of Polarization in Single-Mode Fibers", Fiberoptic Technology, May 1983, pp. 155–161.
Fredricks, R. J. and Ulrich, R., "Phase Error Bounds of Fibre Gyro with Imperfect Polariser/Depolariser", Electronic Letters, vol. 20(8), 330–332 (1984), pp. 277–278.
Loeber, A. P., "Depolarization of White Light by a Birefringent Crystal-II. The Lyot Depolarizer", Journal Optical Society of America, vol. 72, No. 5/May 1982, pp. 650–656.
Burns, William K, "Degree of Polarization in the Lyot Depolarizer", Journal of Lightwave Technology, vol. LT-1, No. 3, Sep. 1983, pp. 475–479.

*Primary Examiner*—Samuel A. Turner
*Attorney, Agent, or Firm*—Varnum, Riddering, Schmidt & Howlett

[57] ABSTRACT

An interferometric fiber-optic gyro system includes a light source and a plurality of optical fiber rings employed to measure angular displacement along three axes. Optical circuit elements interposed between the source and the rings include an optical switch for periodically applying the optical signal to each of the rings individually along three separate optical transmission paths. Included in each of the optical transmission paths is a modal filter, including a polarizer, and a beam splitter which provides two separate beams to the optical ring for counter-propagation through the ring. Compensating birefringent devices are added in the optical circuits to compensate for a residual birefringence introduced by the various optical elements in the circuits. The characteristics of the compensating devices consist of predetermined lengths of polarization preserving, single-mode optical fiber. The birefringence of each of the optical devices is characterized in terms of a total number of beat lengths. A plus or minus sign is assigned to the value of the beat lengths, depending upon the optical axis of the optical device being measured. The birefringent compensating optical fiber is selected so as to cancel the net birefringent effect of the other optical elements in the optical circuit expressed in beat length. The compensating fiber may be distributed in the optical circuit subject to the requirement that each section of optical fiber has an minimum length to assure single-mode transmission.

15 Claims, 2 Drawing Sheets

METHOD AND APPARATUS FOR COMPENSATING FOR THE RESIDUAL BIREFRINGENCE IN INTERFEROMETRIC FIBER-OPTIC GYROS

BACKGROUND OF THE INVENTION

1. Technical Field

The invention relates to optical gyros and more particularly to a method and apparatus for compensating for residual birefringence in interferometric fiber-optic gyros.

2. Background Art

Interferometric fiber-optic gyros used for sensing rate of rotation in aircraft and missile navigation applications are well known. One prior art passive ring, fiber-optic gyro arrangement, which senses rate of rotation about various axes, is described in detail in U.S. Pat. No. 4,828,389 to Gubbins et al., issued May 9, 1989. Such gyros typically include an optical signal source, a beam splitter, a phase modulator and a closed optical fiber ring. The beam splitter divides the light from the source into two beams of equal intensity which travel around the fiber-optic ring, one in the clockwise direction and the other in the counterclockwise direction resulting in two interfering, counter-propagating waves. As the beams emerge from the fiber-optic ring, they are recombined at the beam splitter and routed to an optical detector. The physical length of the clockwise path is identical to that of the counterclockwise path, and absent certain disturbances, the two beams are in phase when they are recombined, and maximum-intensity light is detected at the photodetector.

There are two types of disturbances that can give rise to phase shifts in the light waves, namely, those resulting in reciprocal phase shifts and those resulting in nonreciprocal phase shifts. A reciprocal phase shift occurs when the two light waves are affected by a disturbance in the same manner, and a nonreciprocal phase shift occurs when the disturbance affects one of the counter-propagating waves in a different fashion than the other. It is known, for example, that a nonreciprocal phase shift results from the rotation of the closed optical path, causing the counter-propagating light waves to require different amounts of time to complete a transit of the closed path. This phase shift is known as the Sagnac effect phase shift and provides an indication of angular displacement of the gyro. The use and measurement of the Sagnac effect in optical rate sensors is well known and described, for example, in the text entitled "Fiber-Optic Rotation Sensors and Related Technologies," Springer-Verlag 1982.

The intensity of light resulting from recombined, interfering, counter-propagating light waves may be expressed in terms of the trigonometric cosine waveform. When the phase difference between the counter-propagating waves is close to zero, the cosine function varies only slightly with changes in phase difference, and measurement of the phase shift is made difficult. The measurement of phase shift may be improved by introducing a nonreciprocal phase bias such as $\pi/2$ radians. The induced phase shift causes the intensity signal to be shifted to a more linear portion of the cosine signal curve in order to provide more accurate measurements of the Sagnac effect phase shift.

Because the light beam produced by the source is not always well polarized, two modes of polarization tend to be produced at the source and both can be propagated in the fiber-optic ring as counter-propagating waves. A difficulty is that the two modes of polarization do not propagate with the same velocity nor do they propagate with perfect independence, and coupling between the modes tends to occur. As a result, the detection of the Sagnac effect phase shift is made more difficult. It is well known to add a polarizer filter in the light path in order to enforce polarization in one direction. This technique works in principle if the light exiting the polarizer is highly polarized and the other optical components of the system do not repolarize the light beam. In practice, however, there exist various anisotropic influences in the optical ring and other optical devices, including polarizers, causing birefringence and modifying the state of polarization of the light. As a result, degenerate orthogonal modes of polarization tend to be propagated in the gyro fiber-optic ring, leading to inaccuracies at the detector and an output signal with excessive bias error. This general problem is well understood by those skilled in the art and referenced, for example, by Rashleigh and Stolen in "Preservation of Polarization in Single-Mode Fibers," *Fiber-Optic Technology*, pp. 155–161 May 1983.

Bias error resulting from birefringence of an optical device may be defined in terms of the amplitude extinction ratio (e) for that device and the gyro Sagnac scale factor $K_s$ as follows:

$$\| \text{BIAS ERROR} \| \leq e/\sqrt{2} \, K_s.$$

A typical value for $K_s$ is $5\mu$ rad/degree/hour. Thus, for an acceptable bias error of 0.5 degrees/hour, the value of extinction ratio e has to be $3.5 \times 10^{-6}$. Extinction ratios of this magnitude are generally considered to be unattainable or at least well beyond the current measurement capability. As a point of reference, the above-noted value corresponds to an extinction ratio expressed in terms of decibels of power is equivalent to $-109$ dB, which is not measurable with known measuring techniques. Currently available optical polarizers have extinction ratios in the $-60$ to $-65$ dB range.

The above-described birefringence problem can be alleviated to some extent by using a special Polarization Preserving Single-Mode Optical Fiber (PPSMOF). For a typical fiber ring having a length of 500 meters and using a good quality PPSMOF, it can be shown that a polarizer having an extinction ratio of $-76$ dB is needed in order to compensate for birefringence in the optical gyro with a bias error of 0.5 degrees per hour. The fabrication of a polarizer with such a low extinction ratio is difficult and costly to fabricate and 500 meters of good quality PPSMOF is also difficult to obtain and costly.

To improve the efficiency of the polarizer, it is well known to insert a depolarizer between the optical source and the polarizing filter. The effect of the depolarizer is to shift one of the degenerate polarization modes of the source signal in time, so that it is incoherent with respect to the other polarization mode. If the light beam is split into two independent beams traversing the gyro optical ring and the two independent beams are recombined, theoretically, there should be no measurable interference since the interference peak of the undesired polarization state is shifted beyond the coherence length of the desired mode. The use of a depolarizer, such as the well-known fiber Lyot depolarizer, tends to further reduce the extinction ratio requirement of the polarizer.

Typically, optical gyro systems include additional optical elements such as beam splitters/recombiners and optical couplers, all of which are inherently birefringent. Consequently, optical signals propagated in the optical circuits will be repolarized to some extent by each of these devices. The repolarization due to the birefringence of these circuit devices affects the bias error of the gyro.

It is an object of this invention to provide an interferometric fiber-optic gyro having low bias error and in which the effects of birefringence are minimized.

SUMMARY OF THE INVENTION

These and other problems of the prior art are solved in accordance with this invention by the insertion of a birefringence compensating optical component. In accordance with one aspect of the invention, the birefringence of each of the optical components in an optical circuit is established, including the optical axes of the birefringent component, as well as the net cumulative effect of birefringence of all of the various components and one or more compensation components are added with a predetermined amount of birefringence along an axis oriented to cancel the net birefringence effect of the other components in the optical gyro system.

BRIEF DESCRIPTION OF THE DRAWING

The invention may be better understood from the following description of an illustrative embodiment of the invention with reference to the drawing, in which.

DETAILED DESCRIPTION

Figure 1:
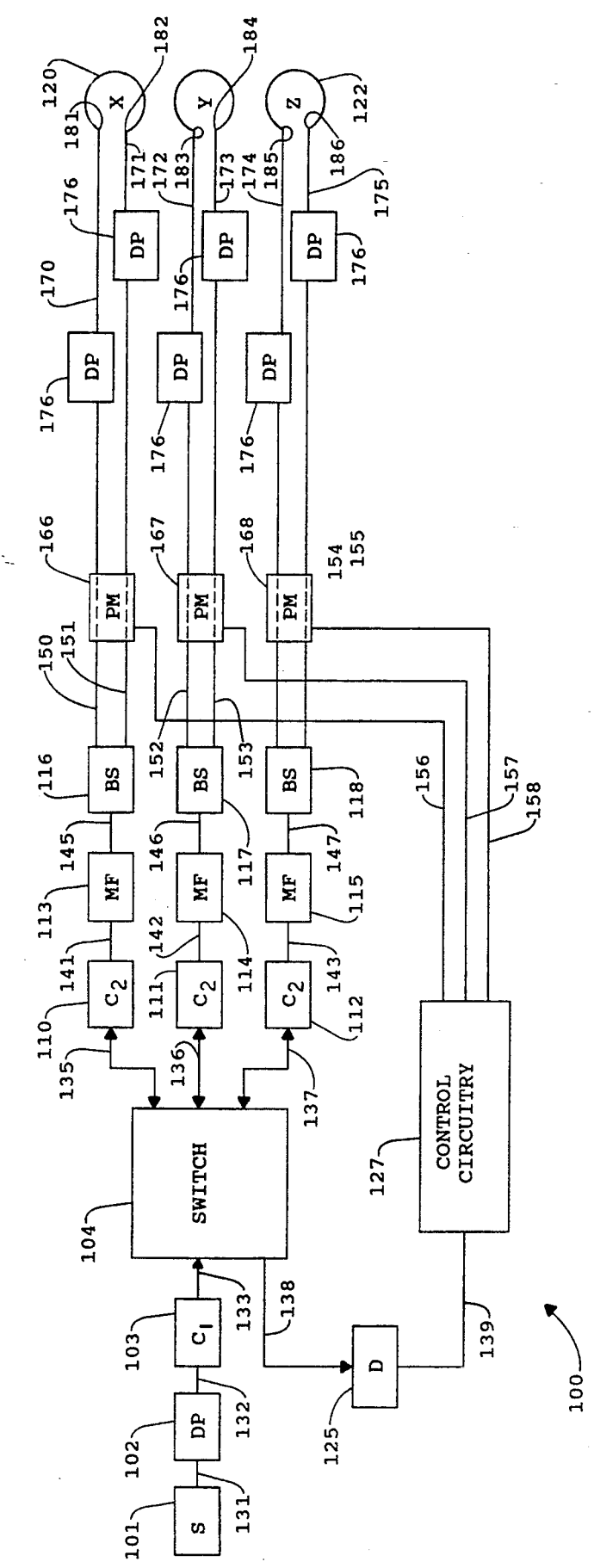
FIG. 1 is a schematic block diagram of an optical rate sensor incorporating principles of the invention.

The principles of the invention are described, by way of example, with reference to integrated optical rate sensor apparatus 100 depicted in the diagrammatic representation of FIG. 1. A rate sensor apparatus of this general type is utilized in inertial reference systems to detect angular rotations and to measure magnitudes and directional sense of the rates of rotation along various axes. The rate sensor apparatus depicted in FIG. 1 may be referred to as a triad rate sensor in that it comprises electrical and optical components required for measuring angular rotation rates along three orthogonal axes, thereby providing sufficient information for a complete navigational application. The apparatus 100 may be referred to as a closed loop configuration since optical signals are modulated so as to generate a detector signal having a substantially null DC component. The theory and operation of closed-loop, triad optical sensors are well known. A particular implementation of such a system is described in detail in U.S. Pat. No. 4,828,389, issued May 9, 1989, to Gubbins et al.

The optical rate sensor 100 comprises a light source 101 for providing a polarized optical signal and may, for example, comprise a laser light source. The optical signal is conducted via conductors 131, 132 and 133 and optical circuit elements 102 and 103, which will be described later herein, to an optical switch 104. The optical switch is operated on a periodic basis, under control of a clock (not shown in the drawing), to conduct the optical signal to one of three separate optical conductors 135, 136 and 137. An optical signal conducted through switch 104 to optical conductor 135 is transmitted to a beam splitter 114, which may be a conventional and well-known beam splitter providing two optical signals, one on each of the optical conductors 150 and 151, of equal magnitude and phase. In a similar fashion, optical signals on conductors 136 and 137 are conducted to beam splitters 117 and 118, respectively. Beam splitter 117 provides two optical signals of equal amplitude and phase on optical conductors 152 and 153 and beam splitter 118 provides two optical signals of equal magnitude and phase on optical conductors 154 and 155. Each pair of corresponding optical signals is conducted to one of the fiber-optic rings 120 through 122. The optical rings 120 through 122 may be well-known optical gyro rings, each comprising a multiple-turn, fiber-optic ring. Each of the rings has two ring ports and one of the light waves generated by the beam splitter is applied to one port and travels through the ring in a clockwise direction while the corresponding optical signal is applied to the other port of the same ring and travels through the ring in a counterclockwise direction. In this manner, each of the two optical signals enters the ring at one port and exits the ring at the other port. By way of example, an optical signal emerging from beam splitter 116 on optical conductor 150 is transmitted via optical circuit element 176 and optical conductor 170 to port 181 of ring 120. The signal exits from port 182 on optical conductor 171 and is transmitted via optical element 176 and optical conductor 151 to the beam splitter 116. The beam splitter 116 serves to recombine the two counter-propagating light waves onto optical conductor 145. The combined optical signal is then transmitted via optical elements 113 and 110 and optical conductors 141 and 135 through switch 104 to optical conductor 138. The combined optical signal on conductor 138 is received at a detector 125 where it is converted to an electrical signal on conductor 139 and is applied to the control circuitry 127.

Switch 104 conducts an optical input signal from the source 101 to one of the optical conductors 135 through 137 for a predetermined period of time while conducting an optical output signal from another of the conductors 135 through 137 to the conductor 125 during the same period of time. The switch remains in a particular connecting state for a period of time sufficient to allow an optical signal to traverse the associated optical ring.

The control circuitry 127, which may comprise a programmable processor, uses the detector output signal on conductor 139 to generate appropriate periodic output signals on conductors 156, 157, 158 to be applied to phase modulators 166, 167, 168, respectively. The phase modulators, in response to the signal received from the control circuitry 127, apply an appropriate phase shift to the optical signal to offset the affect of the Sagnac phase shift and provide an additional phase shift which applies a nonreciprocal bias to the signal to facilitate measurement of the Sagnac effect phase shift. The control circuitry 127 and phase modulators 166 through 168 are well known in the art and the circuitry and methodology for computing the necessary signals to be applied to the phase modulators by the control circuitry are well known and well understood and are described, for example, in the previously mentioned U.S. Pat. No. 4,828,389.

The light source 101 may be a standard laser commonly used in interferometers, which produces an optical signal which is not necessarily well polarized. The depolarizer 102 is added in the circuit to enforce polarization in one direction before the optical signal is applied to the optical rings 120 through 122. The optical circuit includes modal filters 113 through 115, one for each of the optical rings 120 through 122. The modal filters serve to filter an incoming signal such that an outgoing signal comprises only one polarization state of one spatial mode. Such modal filters are well-known devices and can each be physically realized by means of a section of single-mode wave guide and a polarizer. The wave guide essentially allows propagation of only one spatial mode of the optical signal and the polarizer passes essentially one of the two possible polarization states associated with the spatial mode.

Further included in each of the optical circuits is a pair of depolarizers 176 interposed between each of the phase modulators 166 through 168 and the corresponding optical rings 120 through 122. The depolarizers 176 serve to reduce the potential signal fading resulting from cross-coupling ring interactions. The depolarizer 102 and depolarizers 176 may be physically realized by means of a well-known fiber Lyot depolarizer which consists of two birefringent crystals (typically calcite) whose thicknesses in the direction of light propagation are in the ratio of 2:1 and whose optical axes are oriented at 45 degrees with respect to each other. A commercially available Polarization Preserving Single-Mode Optical Fiber (PPSMOF) may also be used to implement the depolarizers by butting two lengths of the PPSMOF together with their optical axes oriented at 45 degrees with respect to each other.

Further included in the optical circuit of FIG. 1 are a compensator 103 interposed between the depolarizer 102 and the switch 104 and compensators 110 through 112 interposed in each of the three optical circuits for the individual rings 120 through 122 between the optical switch 104 and a corresponding one of the modal filters 113 through 115. These compensators serve to compensate for birefringence introduced in the optical circuits by imperfections in the various optical components. We describe herein a method for compensating for birefringences of optical components in an optical system, such as an interferometric fiber-optic gyro, to maximize the effectiveness of the polarizer/depolarizer combinations in the optical circuit in controlling the bias error. In accordance with our invention, the effect of birefringence is controlled by measuring the number of beat lengths caused by birefringence in the various components of the optical circuit and adding birefringent compensator elements such that the sum of the component beat lengths is zero. The compensators may each comprise a section of birefringent material such as known polarization preserving, single-mode optical fiber having a total number of beat lengths designed to offset the net birefringence effect of other optical components in the optical circuit.

The term "beat length" or "beat wavelength" is known in the art. The beat length interval (BL) may be defined as the distance within a birefringent material required for light, polarized at 45 degrees to the optical axes of the material, to complete one cycle through all states of elliptical polarization in the fiber. When the sum of all of the optical beat lengths of a number of serially connected optical components in an optical circuit is equal to zero, the optical circuit preserves the incoherence established by depolarizers in the circuit. This relationship may be expressed as follows:

$$\sum_{0}^{N} BL_n = 0 \quad \text{(equation 1)}$$

In order to determine the characteristics of a compensator required to satisfy the condition of equation 1 for the optical circuit, it is necessary to: (a) measure or characterize the beat length interval (BL) of each of the devices in the optical circuit; (b) establish the physical length (L) of each of the optical devices; and (c) calculate the total number of beat lengths ($BL_n$) for all of the devices. The number of beat lengths for any optical device may be established from the equation $BL_n = L/BL$ (equation 2).

The methodology and apparatus for measuring the beat lengths of an optical component are known. One method for measuring the beat length of the component places the specimen to be measured between a light source, such as a known super-radiant diode, and a polarizer which has its optical axis oriented at a 45-degree angle to the optical axis of the device under test. Light exiting from the device under test is passed through an analyzer, again having optical axis oriented at 45 degrees to the optical axis of the device under test. The light from the analyzer is directed to a known grating spectrometer with known dispersion calibration. The resulting spectrum is a gain curve of the super-radiant device superimposed on cycles of beat length for the device under test. The beat length interval of the device under test can be measured directly from the resulting spectrum. An alternative measurement technique involves the use of a Mach-Zehnder interferometer. In this arrangement, light from a super-radiant diode is polarized by a known polarizer at 45 degrees relative to the optical axis of the material to be characterized. The polarized light is injected into a Mach-Zehnder interferometer whose principle elements are the component to be measured and adjustable reference leg which can be a calibrated Michelson interferometer or a piezoelectric element. The output of the Mach-Zehnder interferometer is analyzed by a known optical analyzer and the resulting light is directed to a photodetector which provides an intensity pattern. The beat length interval is determined by calibrating the length L of the element under test with a known displacement in path length in the reference leg.

Figure 2:
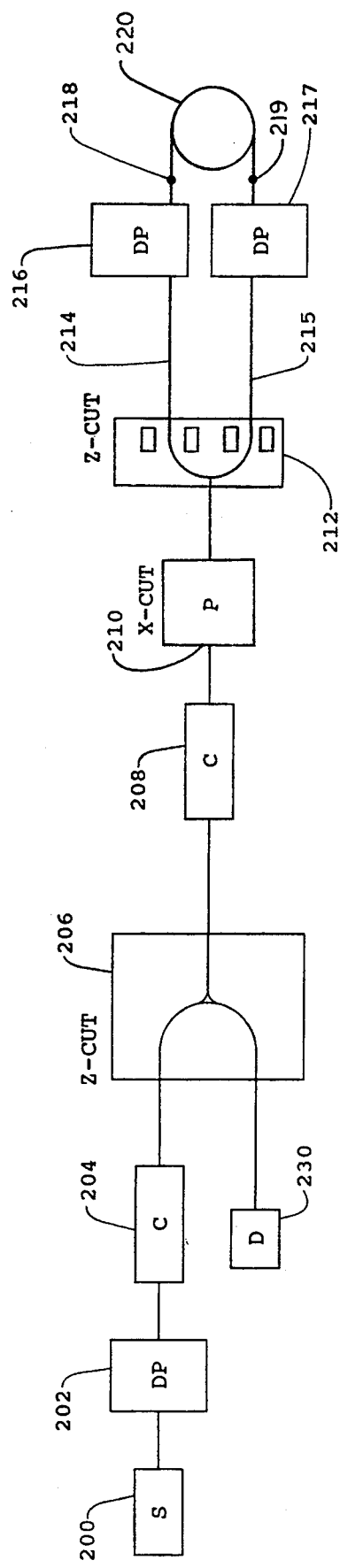
FIG. 2 is a diagrammatic representation of a fiber-optic system to which reference is made to illustrate the method and apparatus of the invention.

FIG. 2 is a simplified block diagram of an interferometric fiber-optic gyro to which reference is made to illustrate the birefringence compensation method and apparatus in accordance with the invention. An optical signal generated by a laser source at 200 is transmitted through a depolarizer 202, a compensator 204, an optical Y coupler 206, a further compensator 208, and a polarizer 210 to a beam splitter 212. Emerging from the beam splitter 212, on optical conductors 214 and 215, are corresponding optical signals of equal phase. One of which is applied to port 218 and the other is applied to port 219 of the optical ring 220. One of these signals will traverse the optical ring 220 in the clockwise direction and the other will traverse the ring in the counterclockwise direction. As the optical signals emerge from the ring ports 218 and 219 they are combined at the beam splitter 212 and the combined signal is transmitted through the polarizer 210 and the compensator 208 and via the Y coupler 206 to a photodetector 230. Additional depolarizers 216, 217 may be interposed between the beam splitter 212 and the optical ring 220. Depolarizer 202 functions to compensate for birefringence of the source and depolarizers 216 and 217 serve to compensate for birefringence in the optical ring 220.

The compensators 204 and 208 are provided to compensate for the birefringence introduced by other optical elements in the circuit namely the Y coupler 206, the polarizer 210 and the beam splitter 212. By the methods described in the previous paragraphs, the number of beat lengths ($BL_n$) in each of the three optical elements 208, 210, and 212 must be determined and the beat lengths for the several elements must be added together. The resulting data is used to ascertain the characteristics of the compensators 204, 208 required to compensate for the birefringence of the identified optical elements. The beat length of each optical element, besides having an ascertainable magnitude, also has an ascertainable sign. The sign being defined by the optical axis and the cut of the crystal. In the diagrammatic representation of FIG. 2, the Y coupler 206 comprises a Z-cut crystal, the polarizer 210 comprises an X-cut crystal and the beam splitter 212 comprises a Z-cut crystal. If in the summing of the total number of beat lengths the Z-cut crystals are assigned a positive sign and the X-cut crystals are assigned a negative sign, the characteristics of the compensating crystals needed to provide a sum of which is equal to zero, can be established. By way of example, the Y coupler 206 may be a Z-cut crystal having a measured beat length of 9.5 micrometers and having a measured length of 2.5941 centimeters, the number of beat lengths for that crystal may be determined from the equation $BL_n = L/BL$. In this example, dividing 2.5941 centimeters by 9.5 micrometers yields 2731 beat lengths. Assuming from the example that the polarizer 210 is an X-cut crystal having a length of 13.376 millimeters and a beat length of 9.5 micrometers, the number of beat lengths for the polarizer is 1408. The characteristics of a compensator which compensates for the birefringence of these two elements is computed by assigning a plus sign to the number of beat lengths of the Z-cut Y coupler and a minus sign to the number of beat lengths of the X-cut polarizer. The sum of these two values is $-1323$. If, for the compensator, one uses a polarization preserving, single-mode optical fiber having a beat length of 1.2 millimeters, 1.103 meters of such optical fiber will be required to compensate for the birefringence of the Z-cut Y coupler and the X-cut polarizer. Similar computations may be performed with respect to the Z-cut beam splitter 212 and a further calculation of the total length of a compensating optical fiber required. The lengths of compensating fiber required may be divided between the two compensators 204 and 208. The distance between the Y coupler 206 and the polarizer 210 must be sufficiently large to accommodate a minimum length of the compensator 208 sufficient to establish the single spatial mode. This minimum distance is conservatively estimated to be between $\frac{1}{4}$ to $\frac{1}{2}$ meter in length. The balance of the length of the compensating fiber may be inserted at the location of compensator 204.

Referring again to FIG. 1, a compensator C2 is inserted in the three optical paths of the triad optical gyro at 110, 111 and 112. The system of FIG. 1 uses an optical switch 104 in place of a Y coupler as shown in FIG. 2 at 206. The number of beat lengths for the optical switch can be measured in the same way as other optical components, as described earlier herein. As mentioned earlier with respect to FIG. 1, the modal filters 113 through 115 each include a polarizer and a section of single-mode wave guide, the beat lengths of which are measured in standard fashion. The phase modulators 166 through 168 comprise electromagnetic transducers which do not introduce birefringence. The depolarizer 102 and depolarizers 176 are designed to compensate for birefringence introduced by the source 101 and optical rings 120 through 122, respectively, as described herein with respect to FIG. 2. In the arrangement of FIG. 1, the C2 compensators 110 through 112 are designed with reference to the number of beat lengths of the switch 104 and the number of beat lengths of the associated one of the modal filters 113 through 115 and the associated one of the beam splitters 116 through 118. Upon selection of a total length of polarization preserving, single-mode optical fiber required for compensation in each of the three optical circuits, a predetermined amount of the required compensation may be assigned to a compensator 103 such that in each case the characteristics of the compensator 103 with each of the three compensators 110 through 112 provides the proper amount of compensation for each of the three optical circuits associated with the three optical rings 120 through 122.

It will be understood that the embodiments described herein are only illustrative of the invention and numerous other embodiments can be envisioned by those skilled in the art without departing from the spirit and scope of the invention as claimed in the following claims.

What is claimed is:

1. An optical circuit comprising an optical path for conducting optical signals from a light source to a light sensitive device, said path comprising:
   a plurality of serially coupled optical elements each having birefringence characteristics resulting in a depolarization component of ascertainable magnitude and ascertainable direction;
   at least one compensating optical element serially connected in said path with said plurality of optical elements and having predetermined inherent birefringence characteristics resulting in a compensating depolarization component of a magnitude substantially equal to the net magnitude of a resultant depolarization component obtained by combining said depolarization components of each of said plurality of optical elements such that oppositely directed components are cancelled, said compensating component having a direction substantially directly opposite to the direction of said resultant depolarization component.

2. The optical circuit in accordance with claim 1 wherein the compensating optical element comprises only a section of single-mode optical fiber.

3. The optical circuit in accordance with claim 1 wherein the birefringence characteristics of said compensating optical element are defined per unit length and wherein the length of said compensating optical element is selected to provide said compensating depolarization component.

4. An interferometric optical gyro comprising:
   an optical signal source generating polarized optical source signal;
   an optical fiber ring;
   an optical sensor;
   a plurality of optical devices comprising an optical beam splitter splitting said optical signal into two counter-propagating optical signals traversing said ring and recombining said counter-propagating signals after traversing said ring to form a recombined ring output signal and an optical coupler conducting said source signal from said source to said beam splitter and conducting recombined ring output signal to said sensor;

each of said plurality of optical devices having birefringence characteristics resulting in a depolarization components of ascertainable magnitude and ascertainable direction; and a compensating optical element serially connected with said plurality of optical devices and having predetermined inherent birefringence characteristics resulting in a compensating depolarization component of a magnitude substantially equal to the net magnitude of a resultant depolarization component obtained by combining said depolarization components of said plurality of optical devices in a manner such that oppositely directed components are cancelled, said compensating component having a direction substantially directly opposite to the direction of said resultant depolarization component.

5. The gyro in accordance with claim 4 wherein the plurality of optical devices further comprises a polarizing optical filter disposed between said coupler and said ring, said filter having birefringence characteristics resulting in a depolarization component of ascertainable magnitude and direction.

6. The gyro in accordance with claim 4 wherein said compensating element comprises a first section disposed between said coupler and said ring and a second section disposed between said coupler and said source.

7. The gyro in accordance with claim 6 wherein the effects of birefringence of each of the optical components and of said sections of said compensating element are defined in terms of a number of beat lengths together with an indication of direction of polarization for each of said optical components and each of said sections and wherein the sum of beat lengths, taking into account the associated directions, is substantially equal to zero.

8. An interferometric optical gyro comprising:
an optical signal source generating polarized optical source signal;
a plurality of optical fiber rings;
an optical sensor;
a plurality of optical beam splitters, each splitting said optical signal into two counter-propagating optical signals traversing a corresponding one of said rings and recombining said counter-propagating signals after traversing said rings to form a recombined ring output signals;
an optical switch for selectively conducting said optical source signal from said source to each of said plurality of rings and for selectively conducting recombined ring output signals from each of said rings to said sensor;
a compensating optical element comprising a compensating element section disposed between said switch and a corresponding one of each of said plurality of beam splitters, each of said sections having predetermined inherent birefringence characteristics resulting in a compensating depolarization component of a magnitude substantially equal to the net magnitude of a corresponding resultant depolarization component obtained by combining said depolarization components of said corresponding one of said beam splitters and said switch in a manner such that oppositely directed components are cancelled, said compensating depolarization component of each of said sections having a direction opposite said direction of said corresponding resultant depolarization component.

9. The optical gyro in accordance with claim 8 wherein the compensating element sections each comprise a section of single-mode optical fiber.

10. An interferometric optical gyro comprising:
an optical signal source generating polarized optical source signal;
a plurality of optical fiber rings;
an optical sensor;
a plurality of optical beam splitters, each splitting said optical signal into two counter-propagating optical signals traversing a corresponding one of said rings and recombining said counter-propagating signals after traversing said rings to form a recombined ring output signals;
an optical switch for selectively conducting said optical source signal from said source to each of said plurality of rings and for selectively conducting recombined ring output signals from each of said rings to said sensor;
a compensating optical element comprising a first compensating element section disposed between said source and said switch and an additional compensating element section disposed between said switch and a corresponding one of said plurality of beam splitters, each of said sections having predetermined inherent birefringence characteristics, said characteristics of each of said sections determined such that a combined compensating depolarization component resulting from said birefringence characteristics of said first section taken together with said birefringence characteristics of said additional section has a magnitude substantially equal to the net magnitude of a corresponding resultant depolarization component obtained by combining said depolarization components of a corresponding one of said beam splitters and said switch in a manner such that oppositely directed components are cancelled, said combined compensating depolarization component having a direction opposite said direction of said corresponding resultant depolarization component.

11. The optical gyro in accordance with claim 10 wherein the compensating element sections each comprise a section of single-mode optical fiber.

12. A method of compensating for depolarization introduced by birefringence inherent in optical components in an optical circuit, comprising the steps:
measuring the number of beat lengths and direction of polarization of each of a plurality of individual optical components of said optical circuit;
computing a net depolarization component for the optical circuit, having a magnitude and direction, by adding the number of beat lengths in each direction of polarization for each of said plurality of optical components; and
adjusting the physical characteristics of said plurality of optical components of said optical circuit such that said net polarization component is equal to zero.

13. The method in accordance with claim 12 wherein said step of adjusting comprises adding to the optical circuit a compensating optical element having predetermined inherent birefringence characteristics resulting in a depolarization component having a magnitude substantially equal to the magnitude of said net depolarization component and a direction opposite said direction of said net depolarization component such that the magnitude of the combined depolarization component obtained by combining depolarization components of said plurality of optical components and said compensating optical component is equal to zero.

14. The method in accordance with claim 13 wherein the step of measuring comprises the steps of measuring the beat length interval of each of the individual optical components of the optical circuit, establishing the physical length of each of the individual optical devices and calculating the total number of beat lengths for the plurality of individual optical devices.

15. The method in accordance with claim 14 wherein the step of adding a compensating optical element comprises adding a section of a selected length of single-mode optical fiber having a predetermined beat length.

* * * * *